United States Patent
Hao

(10) Patent No.: US 8,483,050 B2
(45) Date of Patent: Jul. 9, 2013

(54) METHOD AND APPARATUS FOR ETHERNET RING PROTECTION

(75) Inventor: Long Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 12/422,466

(22) Filed: Apr. 13, 2009

(65) Prior Publication Data

US 2009/0196172 A1 Aug. 6, 2009

Related U.S. Application Data

(63) Continuation of application No. PCT/CN2007/070864, filed on Oct. 10, 2007.

(30) Foreign Application Priority Data

Jan. 23, 2007 (CN) .......................... 2007 1 0073029

(51) Int. Cl.
*H04J 1/16* (2006.01)

(52) U.S. Cl.
USPC .......................................... 370/222; 370/245

(58) Field of Classification Search
USPC .................. 370/216, 217, 218, 219, 221, 222, 370/223, 225; 398/1, 2, 3, 4
See application file for complete search history.

(56) References Cited

U.S. PATENT DOCUMENTS

| | | | |
|---|---|---|---|
| 6,625,115 B1 * | 9/2003 | Ikeda et al. | 370/217 |
| 7,706,254 B2 * | 4/2010 | Moore et al. | 370/219 |
| 2006/0215544 A1 * | 9/2006 | Asa et al. | 370/216 |
| 2007/0076590 A1 * | 4/2007 | Galpin et al. | 370/216 |
| 2007/0253330 A1 * | 11/2007 | Tochio et al. | 370/222 |

FOREIGN PATENT DOCUMENTS

| | | |
|---|---|---|
| CN | 1543136 A | 11/2004 |
| CN | 1812361 A | 8/2006 |
| CN | 1859220 A | 11/2006 |
| CN | 1909496 A | 2/2007 |
| EP | 1 511 243 A1 | 3/2005 |
| EP | 1 727 313 A1 | 11/2006 |
| WO | WO 03/077459 | 9/2003 |

OTHER PUBLICATIONS

International Search Report from P.R. China in International Application No. PCT/CN2007/070864 mailed Jan. 24, 2008.
Supplementary European Search Report for Application No. 07817055,2, dated Aug. 14, 2009, 8 pages.

(Continued)

*Primary Examiner* — Obaidul Huq

(57) ABSTRACT

An Ethernet Ring Protection (ERP) method and the corresponding apparatus and communication equipment are disclosed. The method includes: when a link on an Ethernet ring network is faulty, judging whether the faulty link is a link where the normally blocked port is located; sending a control message which carries first indication information if the faulty link is the link where the normally blocked port is located; the ring node avoids clearing of a forwarding table after receiving the control message which carries the first indication information; sending the control message which carries second indication information if the faulty link is not the link where the normally blocked port is located; and the ring node clears the forwarding table after receiving the control message which carries the second indication information. Through the method and apparatus according to the present disclosure, the broadcast traffic generated by unnecessary clearing of the forwarding table and self-learning is reduced effectively.

1 Claim, 6 Drawing Sheets

OTHER PUBLICATIONS

First Chinese Office Action dated (mailed) Jan. 8, 2010, issued in related Chinese Application No. 200710073029.2. Huawei Technologies Co., Ltd.

Written Opinion of the International Searching Authority (translation) dated (mailed) Jan. 24, 2008, issued in related Application No. PCT/CN2007/070864, filed Oct. 10, 2007, Huawei Technologies Co., Ltd.

European Patent Office Communication pursuant to Article 94(3) EPC, European search opinion for Application No. 07817055.2, mailed Jan. 27, 2011, Huawei Technologies Co., Ltd.

* cited by examiner

| MSB | | | | | | | LSB |
|---|---|---|---|---|---|---|---|
| 8 | 7 | 6 | 5 | 4 | 3 | 2 | 1 |
| RDI | Reserved (0) | | | | Period | | |

METHOD AND APPARATUS FOR ETHERNET RING PROTECTION

CROSS-REFERENCE TO RELATED APPLICATIONS

This application is a continuation of International Application No. PCT/CN2007/070864, filed on Oct. 10, 2007, which claims the priority benefit of Chinese Patent Application No. 200710073029.2, filed on Jan. 23, 2007.

TECHNICAL FIELD

The present invention relates to Ethernet technologies, and in particular, to a method and apparatus for Ethernet Ring Protection (ERP).

BACKGROUND

With the rapid development of the carrier-class Ethernet, the ERP has become an Ethernet service protection method that attracts wide attention in the industry. Based on a physical or logical ring topology, the ERP uses the closed loop and the Ethernet features to implement point-to-point, point-to-multipoint, and multipoint-to-multipoint fast protection switching of services. The ERP is characterized by high utilization ratio of bandwidth, high speed of protection switching, low cost of network construction, and support of point-to-multipoint, and multipoint-to-multipoint service switching.

The Ethernet ring network takes on a ring topology on the physical layer. In order to prevent infinite loop of a packet on the Ethernet ring, a blocked port is set on the link layer. When the service packet passes through the blocked port, the blocked port discards the packet. Generally, the same physical topology may correspond to multiple ring instances, and each ring instance has a corresponding blocked port. A ring instance may correspond to a control Virtual Local Area Network (VLAN) and one or a group of service VLAN(s). It should be noted that the control VLAN is generally used to transmit the control messages of ring instances, and the blocked port does not block the packet and traffic on the control VLAN.

The process of the ERP fault detection and fault recovery is outlined below by reference to accompanying drawings.

FIG. 1 shows an Ethernet ring network in the prior art. As shown in FIG. 1, bridges 1 to 6 serve as nodes to form an Ethernet ring. Port 10 of bridge 1 is a blocked port. Normally, when a service packet passes through the blocked port, the service packet is discarded by the blocked port. The process of fault detection and fault recovery of the Ethernet ring network is detailed below:

1. Fault Detection

The fault detection of the Ethernet ring network is implemented through detection of the ring span. Specifically, Continuity Check (CC) packets are sent periodically to check whether the link between adjacent bridges is normal and to detect faults quickly. If a node fails to receive the CC packet from the adjacent node within a preset period, the link between the node and the adjacent node is determined as faulty.

2. Service Protection in the Case of Faults

After a node detects a fault in the link between the node and its adjacent node, the node blocks the ports at both ends of the faulty link and sends a control message to other nodes on the ring. After receiving the control message, other nodes unblock the normally blocked port, clear the forwarding table, and restart self-learning.

3. Fault Recovery

When a node detects that a fault recovers, the node unblocks the port which is blocked due to link fault, and sends a fault recovery message to other nodes on the ring. After receiving the fault recovery message, other nodes block the normally unblocked port again, clear the forwarding table, and restart self-learning. The Ethernet ring network recovers the normal working state.

The ERP process in the prior art described above reveals that all nodes on the ring clear the forwarding table and restart self-learning once any link fails. In fact, the self-learning may not be necessary in the following circumstances.

FIG. 2 shows a topology of an Ethernet ring network in which the link where the normally blocked port 10 is located fails. As shown in FIG. 2, when faults occur and faults recover on the link between bridge 1 and bridge 2, the faulty link is the link where the normally blocked port is located. After the link fails, the ports on both ends of the link are blocked. The network topology is the same as that before the fault occurs. In this case, the nodes on the Ethernet ring network do not need self-learning because the entries of the forwarding table after self-learning are consistent with those before self-learning.

After the forwarding table of the nodes on the Ethernet ring network is cleared, it is impossible to create a forwarding table again unless self-learning is performed again. In the process of creating a forwarding table, massive broadcast traffic exists on the Ethernet ring network, thus increasing the network load and occupying too many bandwidth resources. Therefore, it may be useful to reduce unnecessary clearing of the forwarding table and self-learning caused by fault occurrence and fault recovery.

SUMMARY

An ERP method and apparatus are disclosed in an embodiment of the present disclosure to suppress unnecessary clearing of the forwarding table and self-learning, and reduce the broadcast traffic caused by fault occurrence and fault recovery.

An ERP method provided in some embodiments of the present disclosure include:

judging whether the faulty link is a link where a normally blocked port is located when a link on an Ethernet ring network is faulty; and suppressing the sending of a control message if the faulty link is the link where the normally blocked port is located.

Another ERP method provided in an embodiment of the present disclosure includes:

judging whether the faulty link is a link where a normally blocked port is located when a link on an Ethernet ring network is faulty;

sending a control message that carries first indication information, if the faulty link is the link where the normally blocked port is located; and avoiding clearing, by a ring node, a forwarding table after receiving the control message that carries the first indication information.

An ERP apparatus disclosed in some embodiments of the present disclosure include:

a link state detecting module, configured to: detect a link state through a received notification, and send link fault information or link fault recovery information to a judging module after detecting a link fault or link fault recovery;

an information storing module, configured to store information about a normally blocked port on an Ethernet ring network;

a judging module, configured to: judge, according to the information about the normally blocked port stored in the information storing module, whether the faulty link or fault recovery link is a link where the normally blocked port is located, and instruct a control message generating module to send a control message to other nodes if the faulty link or fault recovery link is not a link where the normally blocked port is located; and a control message generating module, configured to generate and send a control message to other adjacent nodes, where the control message notifies other nodes whether to clear the forwarding table.

It can be seen from the technical solution according to the present disclosure reveals that by judging whether the faulty link or fault recovery link is a link where the normally blocked port is located, a decision is made about whether to instruct other nodes on the Ethernet ring network to clear the forwarding table. Therefore, the trouble for the nodes on the ring network to clear the forwarding table and restart self-learning after any link becomes faulty or any link fault recovers in the prior art may be avoided, the broadcast traffic generated by unnecessary clearing of the forwarding table and self-learning may be reduced effectively, and the bandwidth utilization ratio on the Ethernet ring network may be improved.

DETAILED DESCRIPTION

In order to make the technical solution, objectives and merits of the present disclosure clearer, the present disclosure is hereinafter described in detail by reference to accompanying drawings and preferred embodiments.

Embodiment 1

Figure 1:
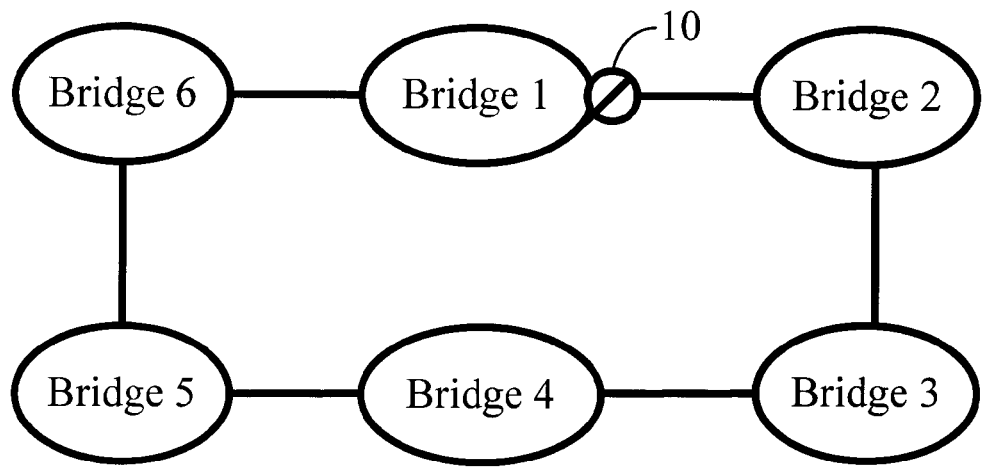
FIG. 1 shows an Ethernet ring network in the prior art.
Figure 2:
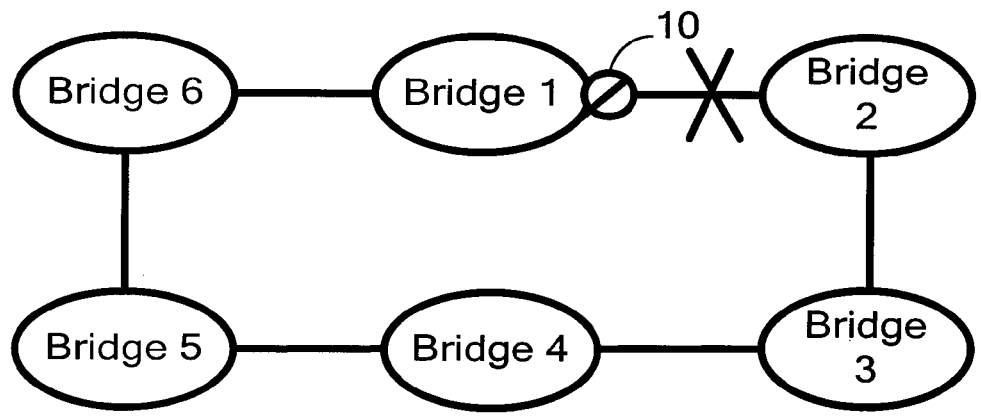
FIG. 2 shows a topology of an Ethernet ring network in which the link where the normally blocked port is located fails as illustrated in FIG. 1.
Figure 3:
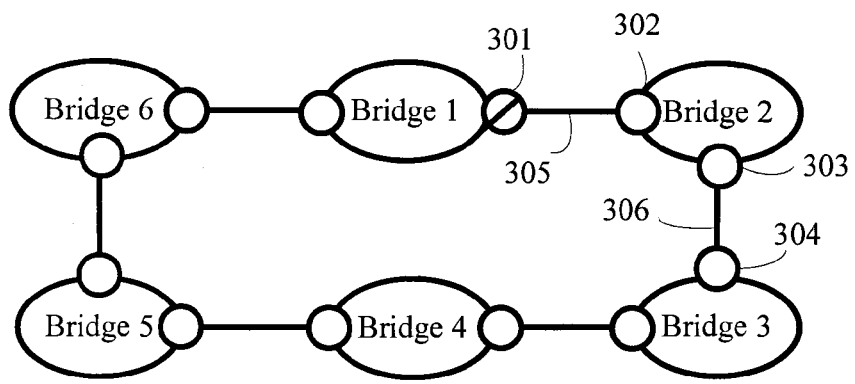
FIG. 3 shows an exemplary topology of an Ethernet ring network according to an embodiment of the present disclosure.

FIG. 3 shows a topology of an Ethernet ring network in an embodiment of the present disclosure. As shown in FIG. 3, bridges 1 to 6 are nodes on an Ethernet ring, 301 is a normally blocked port, 302, 303 and 304 are normal ports on the ring, and 305 and 306 are links between nodes. All nodes on the Ethernet ring network have preconfigured the information indicating that 301 is a normally blocked port, and other ports are ordinary ports on the ring. It should be noted that, FIG. 3 shows an exemplary network topology structure according to some embodiments of the present disclosure, and is not intended to limit the network modality applicable to the technical solution according to the present disclosure.

Figure 4:
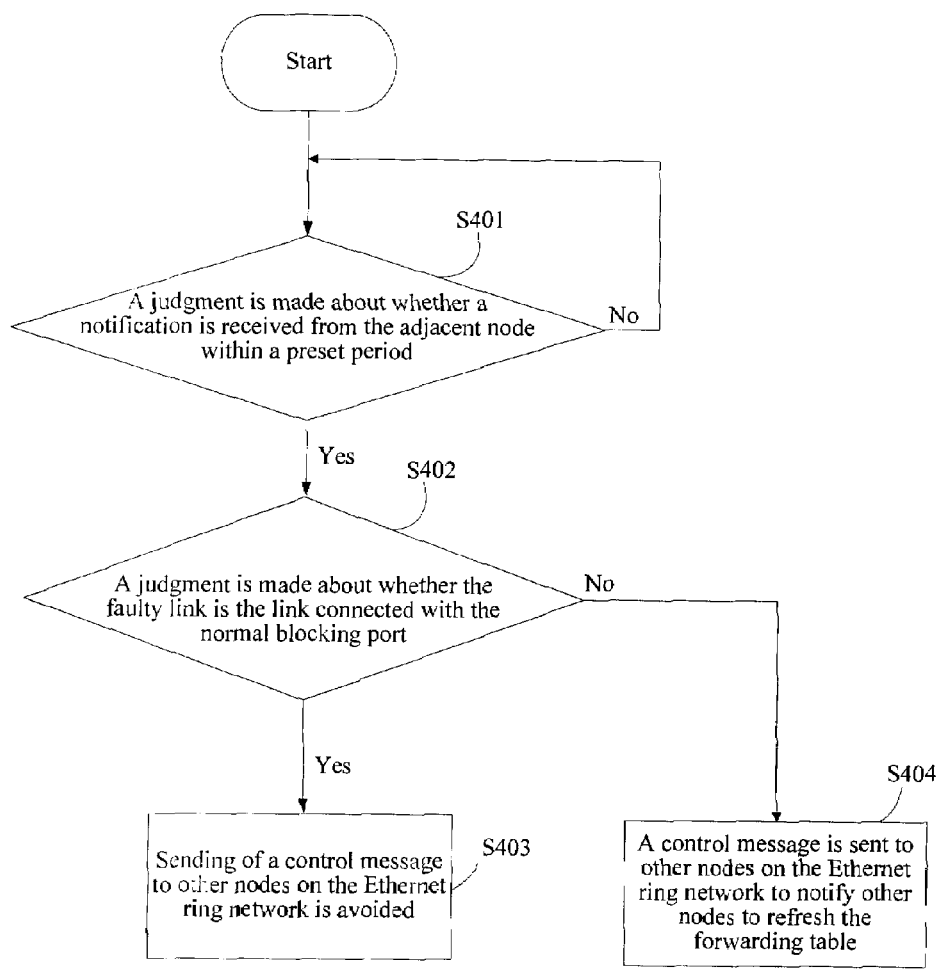
FIG. 4 shows an exemplary flowchart of an ERP method disclosed in a first embodiment of the present disclosure.

FIG. 4 is a flowchart of an ERP method disclosed in the first embodiment of the present disclosure. As shown in FIG. 4, the method includes the following:

Step S401: A judgment is made about whether the node on the Ethernet ring network receives the notification from the adjacent node within a preset period. If the node on the Ethernet ring network receives the notification from the adjacent node within the preset period, the process proceeds to S402; otherwise, this step is repeated.

In this step, the notification may be a CC packet, and the CC packet may be used to detect faults between the nodes on the Ethernet ring network.

Each node sends CC packets to its adjacent nodes periodically. If a node fails to receive the CC packet from the adjacent node within a preset period, the link between the node and the adjacent node is determined as faulty.

Step S402: A judgment is made about whether the faulty link is a link where the normally blocked port is located. If the faulty link is a link where the normally blocked port is located, the process proceeds to S403; otherwise, the process proceeds to step S404.

In this step, all the nodes on the ring network have configured information about the normally blocked port. If the port of the faulty link is consistent with the preconfigured normally blocked port, it is determined that the faulty link is the link where the normally blocked ports are located.

Step S403: The node that detects the link fault avoids (namely, suppresses) the sending of a control message to other nodes on the Ethernet ring network.

In this step, because the faulty link is the link where the normally blocked ports is located, the network topology after fault occurrence is the same as that before fault occurrence. Therefore, the node that detects the fault does not need to send any control message to other nodes, and other nodes do not refresh the forwarding table or restart self-learning.

Step S404: The node that detects the link fault sends a control message to other nodes on the Ethernet ring network, notifying other nodes to refresh the forwarding table.

The control message may be an Alarm Indication Signal (AIS) packet in the Ethernet Operation Administration and Maintenance (OAM) mechanism, or an Automatic Protection Switching (APS) packet in the Ethernet protection switching mechanism, and is transmitted through a control VLAN. In this embodiment, the AIS packet is taken as an example.

In this step, because the faulty link is not the link where the normally blocked ports are located, the normally blocked port is unblocked after fault occurrence, the ports on both ends of the faulty link are blocked, and the network topology changes after the fault occurrence. Therefore, the node that detects the fault may send an AIS packet to other nodes, notifying other nodes to refresh the forwarding table and restart self-learning to create a new forwarding table.

In this embodiment, when the node on the ring network detects fault recovery, the method further includes:

judging whether the recovered link is the link where the blocked ports locate: if the recovered link is the link where the blocked ports locate, suppressing the sending of a fault recovery message to other nodes on the ring network; otherwise, sending a fault recovery message to other nodes.

After receiving the fault recovery message, other nodes on the ring network clear the local forwarding table and restart self-learning. Meanwhile, the ports on both ends of the recovered link are unblocked again, the normally blocked ports are blocked again, and the Ethernet ring network recovers the normal state.

Embodiment 2

The second embodiment differs from the first embodiment in that: A node on the Ethernet ring network does not preset the information about whether the peer port of the link is a normally blocked port. Instead, a message sent from a port to the peer port of the link indicates whether the port is a blocked port or not. In this embodiment, the node judges, according to the identifier information of the normally blocked port carried in the CC packet, whether the peer port of the link is a normally blocked port, thus determining whether the link of the port is a link where the normally blocked port is located.

The operation procedure in this embodiment is the same as the operation procedure shown in FIG. 4 except that: in step S401, the CC packet carries identifier information indicating whether the port is a normally blocked port.

Figure 5:
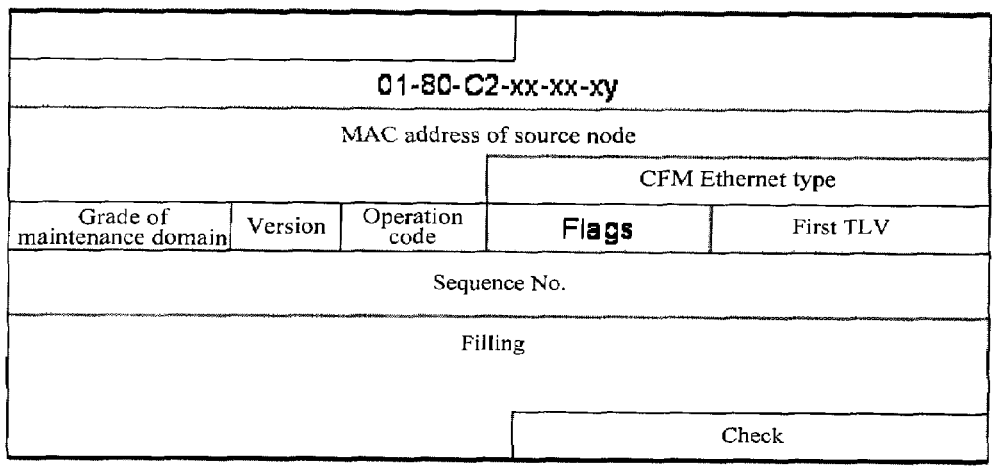
FIG. 5 shows an exemplary frame format of a CC packet according to a second embodiment of the present disclosure.
Figures 6, 7:
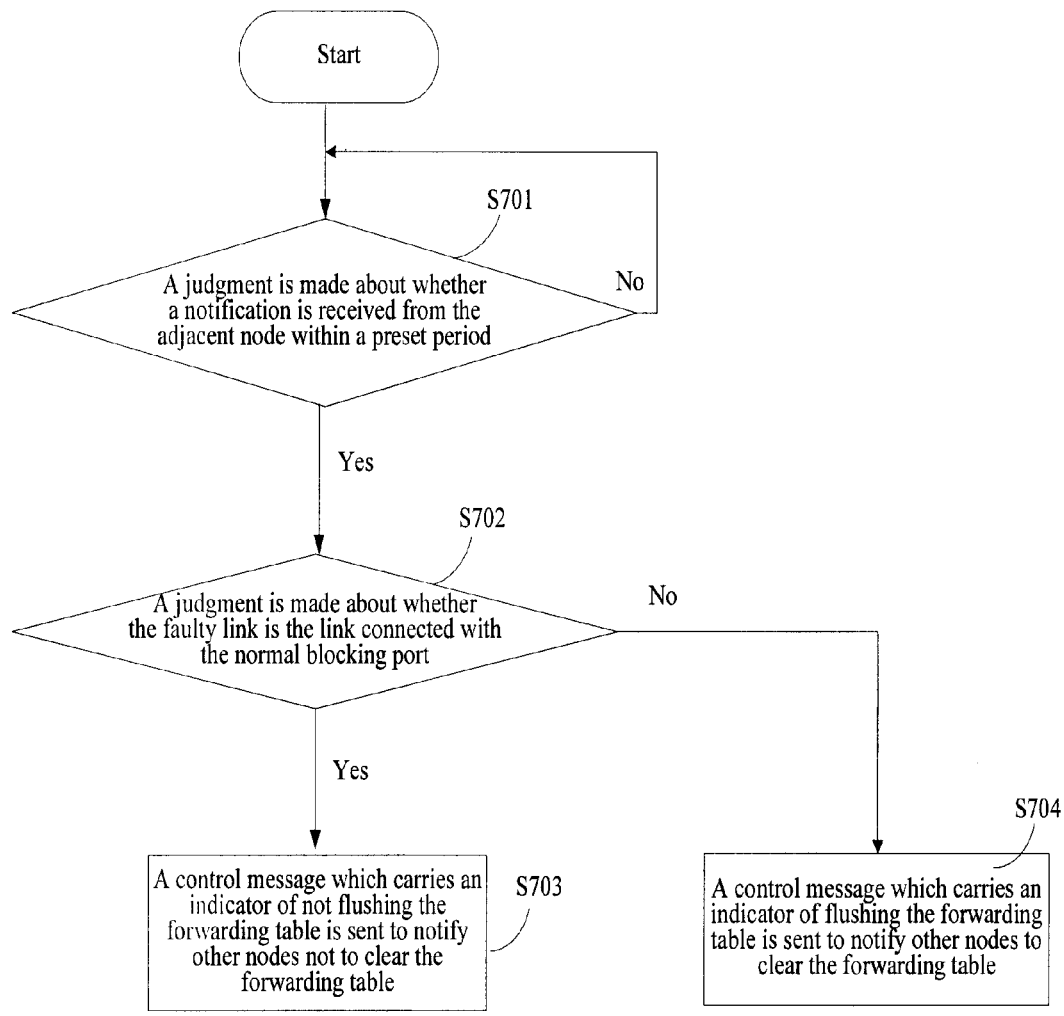
FIG. 6 shows an exemplary format of a Flag field in the CC packet illustrated in FIG. 5.
FIG. 7 an exemplary flowchart of another ERP method disclosed in an embodiment of the present disclosure.

FIG. 5 shows an exemplary frame format of a CC packet. As shown in FIG. 5, the CC packet carries a Flags field. The standard format of the Flags field is shown in FIG. 6. The Flags field contains several reserved bits, and it is appropriate to use one of the bits to indicate whether the port which sends the CC packet is a normally blocked port. For example, the seventh reserved bit of the Flags field is used to indicate whether the port which sends the CC packet is a normally blocked port. If the value of the seventh reserved bit is 1, it indicates that the port is a normally blocked port; if the value is 0, it indicates that the port is a normal port.

For example, when node 1 in FIG. 3 sends a CC packet from a normally blocked port to node 2, the seventh reserved bit of the Flags field in the CC packet is set to 1, indicating that port 301 which sends the CC packet is a normally blocked port. When node 1 sends a CC packet from a normally blocked port to node 6, the seventh bit (bit 7) of the Flags field in the CC packet is set to 0, indicating that the port which sends the CC packet is a normal port.

Accordingly, in step S402, when faults occur, the node on the Ethernet ring network judges, according to the identifier information in the received notification, whether the faulty link is the link where the normally blocked port is located.

For example, after receiving a CC packet sent by port 301 of node 1 from port 302, node 2 in FIG. 3 checks whether the value of bit 7 of the Flags field in the CC packet is 1, and, if the value of bit 7 of the Flags field in the CC packet is 1, records the link of port 301 as the link where the normally blocked port is located. After detecting that the link of a port is faulty, the node judges, according to the previously recorded information, whether the faulty link is the link where the normally blocked port is located.

Further, this embodiment also covers the corresponding processing procedure in the case of fault recovery. Such processing procedure is the same as the processing procedure in embodiment 1, and is not repeated here any further.

Embodiment 3

In the first and second embodiments, when faults occur or faults recover on the link where the normally blocked port is located, the nodes on the Ethernet ring network do not need to clear the forwarding table or restart self-learning. Therefore, it may not be necessary to send a control message which notifies other nodes to clear the forwarding table. In the case, however, other nodes are unaware of the fault of the link where the normally blocked port is located. In this embodiment, when the link where the normally blocked port is located is faulty, the nodes on the ring network do not need to clear the forwarding table or restart self-learning, but receive a control message to know the link fault on the ring network.

As shown in FIG. 7, the operation procedure in this embodiment is the same as the operation procedure illustrated in FIG. 4 except that, after a node detects a link fault on a port, the control message sent to other nodes carries an indicator about whether to clear the forwarding table or not. The indicator is defined according to the previously recorded information. If the faulty port is a port of the link where the normally blocked port is located, the indicator indicates no clearing of the forwarding table (the first indication information). If the faulty port is not a port of the link where the normally blocked port is located, the indicator indicates clearing of the forwarding table (the second indication information).

The control message may be an AIS packet in the Ethernet OAM mechanism, or an APS packet in the Ethernet protection switching mechanism, and is transmitted through a control VLAN. In this embodiment, the AIS packet is taken as an example.

Figure 8:
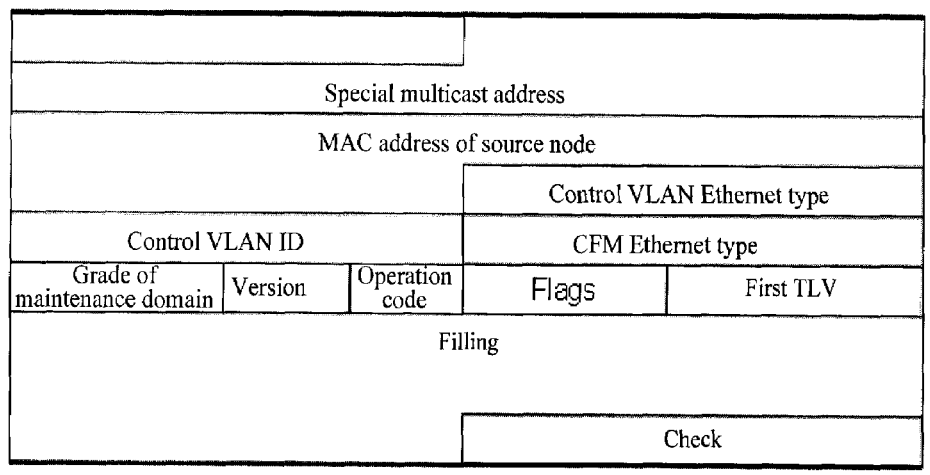
FIG. 8 shows an exemplary frame format of an AIS packet according to a third embodiment of the present disclosure.
Figure 9:
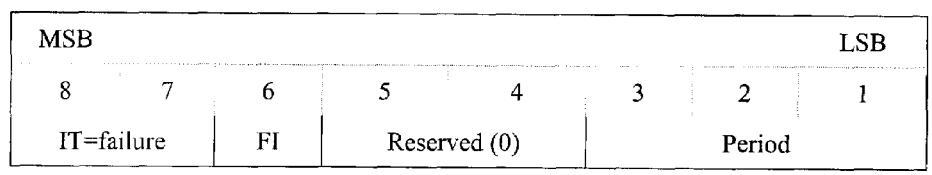
FIG. 9 shows an exemplary format of a Flag field in the AIS packet illustrated in FIG. 7.

FIG. 8 shows a standard frame format of an AIS packet applied on the Ethernet ring. As shown in FIG. 8, the AIS packet includes a Flags field. As shown in FIG. 9, bit 8 and bit 7 may be used to indicate the Indication Type (IT): The values of IT are "failure" and "recovery". The value "failure" indicates that the type of the alarm information is fault occurrence, and the value "recovery" indicates that the type of the alarm information is fault recovery. Moreover, bit 6 may be used as a Flush Indication (FI). If the value of FI is 1, it indicates that it is necessary to clear the forwarding table. If the value of FI is 0, it indicates that it is unnecessary to clear the forwarding table.

For example, the node on the Ethernet ring network shown in FIG. 3 presets the information indicating that port 301 is a normally blocked port, or knows such information according to the identifier information carried in the previously sent CC packet and records the information. When node 2 in FIG. 3 detects that the link where port 301 locates is faulty, node 2 knows that the faulty link is the link where the normally blocked port is located. Therefore, when sending the alarm information, node 2 sets the IT to "failure", and sets the FI to 0.

After receiving the alarm packet, other nodes check the FI, and if the value of FI is 1, clear the forwarding table for ease of restarting self-learning later, or if the value of FI is 0, avoid clearing the forwarding table.

In this embodiment, when the node on the ring network detects fault recovery, the method further includes the following:

if the fault recovery link is the link where the normally blocked port is located, the node which detects the fault recovery sends alarm information to other nodes on the ring network, where the alarm information is a fault recovery message. In this embodiment, the IT=recovery of the Flag field in the AIS packet may be used to indicate the AIS packet as fault recovery message, and the FI is set to 0;

if the fault recovery link is not the link where the normally blocked port is located, the node which detects the fault recovery sends alarm information to other nodes on the ring network, where the alarm information is a fault recovery message. In this embodiment, the IT=recovery in the AIS packet may be used to indicate the AIS packet as fault recovery message, and the FI is set to 1;

after receiving the fault recovery message, other nodes on the ring network decide whether to clear the local forwarding table and restart self-learning according to the FI in the fault recovery message. Meanwhile, the ports on both ends of the fault recovery link are unblocked again, the normally blocked port is blocked again, and the Ethernet ring network recovers the normal state.

Based on the same conception as the foregoing ERP method, an ERP apparatus is disclosed herein. Because the apparatus and the method are based on the same conception of the disclosed embodiments, the embodiments of the apparatus have many identical or equivalent technical features, and such technical features are outlined without elaboration.

Embodiment 4

Figure 10:
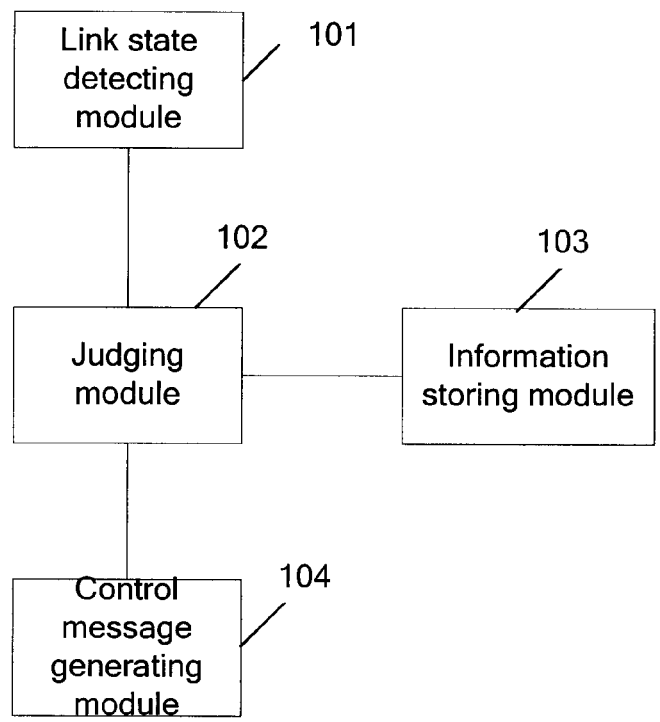
FIG. 10 shows an exemplary structure of an ERP apparatus disclosed in a fourth embodiment of the present disclosure.

FIG. 10 shows a structure of an ERP apparatus disclosed in the fourth embodiment of the present disclosure. The apparatus is located on the node of the ring network. As shown in FIG. 10, the apparatus includes:

a link state detecting module 101, configured to: receive a notification (for example, a CC packet mentioned in the method embodiment herein) from adjacent nodes, judge the link state according to the notification, and send link fault information or link fault recovery information to a judging module 102 after detecting a link fault or link fault recovery on the link between a local node and an adjacent node;

a judging module 102, configured to: judge, according to the information about the normally blocked port stored in an information storing module 103, whether the faulty link or fault recovery link is a link where the normally blocked port is located; and instruct a control message generating module 104 to send a control message to other nodes if the faulty link or fault recovery link is not a link where the normally blocked port is located, wherein the control message is used to notify other nodes whether to clear the forwarding table or not;

an information storing module 103, configured to store information about the normally blocked port on an Ethernet ring network; and a control message generating module 104, configured to generate and send a control message to other adjacent nodes, wherein the control message may be an AIS packet or an APS packet.

The process of using the apparatus in this embodiment to perform ERP is the same as the process described in the foregoing method embodiment of the present disclosure, and is not repeated here any further.

Embodiment 5

Figure 11:
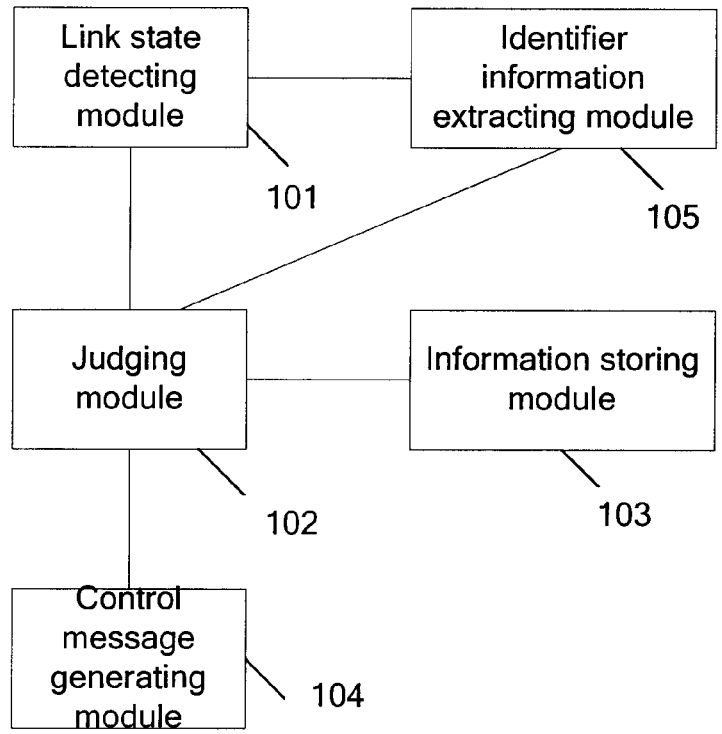
FIG. 11 shows an exemplary structure of an ERP apparatus disclosed in a fifth embodiment of the present disclosure.

FIG. 11 shows a structure of an ERP apparatus disclosed in the fifth embodiment of the present disclosure. As shown in FIG. 11, this embodiment differs from the fourth embodiment in that: The apparatus provided in this embodiment further includes:

an identifier information extracting module 105, configured to: extract identifier information from the notification received by the link state detecting module 101, where the identifier information indicates whether the port which sends the control message is a normally blocked port; and send the identifier information to a judging module 102; and the judging module 102, configured to: judge, according to the identifier information stored in the information storing module 103 and the identifier information extracted by the identifier information extracting module 105, whether the faulty link or fault recovery link is a link where the normally blocked port is located; and instruct a control message generating module 104 to send a control message to other nodes if the faulty link or fault recovery link is not a link where the normally blocked port is located.

Embodiment 6

Figure 12:
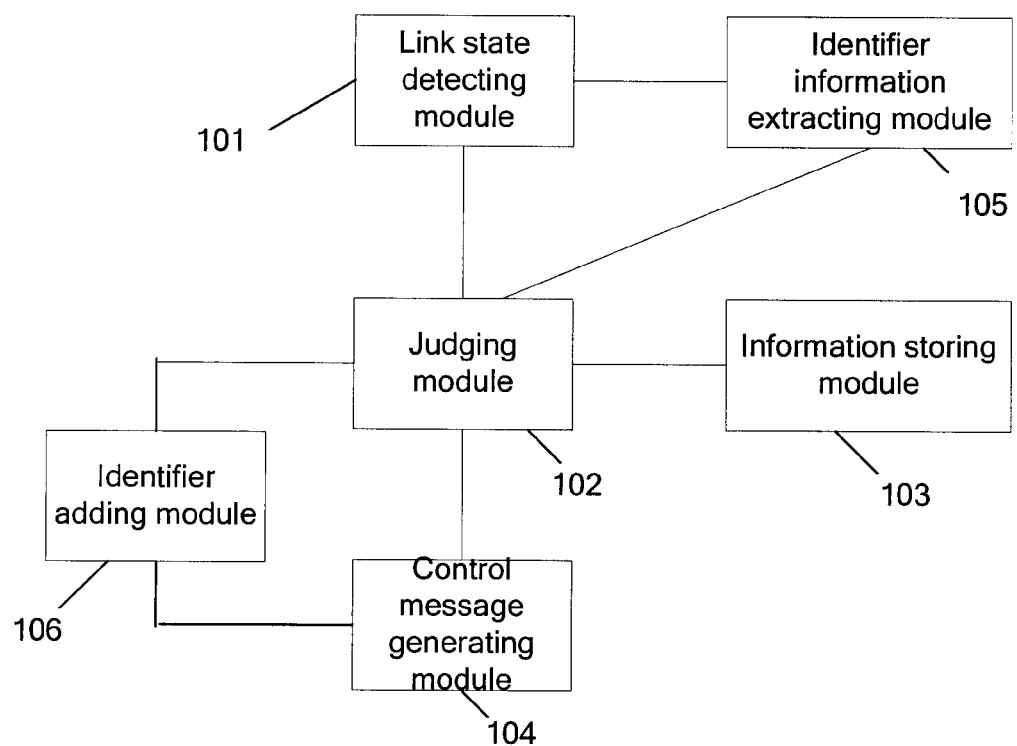
FIG. 12 shows an exemplary structure of an ERP apparatus disclosed in a sixth embodiment of the present disclosure.

FIG. 12 shows a structure of an ERP apparatus disclosed in the sixth embodiment of the present disclosure. As shown in FIG. 12, this embodiment differs from the fifth embodiment in that: This embodiment includes an identifier adding module 106, configured to know, from the judging module 102, whether the faulty link or fault recovery link is the link where the normally blocked port is located, and add, according to the judgment result of the judging module 102, an identifier into the control message generated by the control message generating module 104, where the identifier indicates whether to clear the forwarding table.

Specifically, if the faulty link or fault recovery link is the link where the normally blocked port is located, the identifier adding module 106 adds an identifier of not clearing the forwarding table (the first indication information) into the control message. If the faulty link or fault recovery link is not the link where the normally blocked port is located, the identifier adding module 106 adds an identifier of clearing the forwarding table (the second indication information) into the control message.

Through the method and apparatus provided in the embodiments of the present disclosure, by judging whether the faulty link or fault recovery link is a link where the normally blocked port is located, a decision is made about whether to instruct other nodes on the Ethernet ring network to clear the forwarding table. Therefore, the trouble for the nodes on the ring network to clear the forwarding table and restart self-learning after any link fault occurs or link fault recoveries in the prior art may be avoided, the broadcast traffic generated by unnecessary clearing of the forwarding table and self-learning may be reduced effectively, and the bandwidth utilization ratio on the Ethernet ring network may be improved.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. An Ethernet Ring Protection (ERP) method, comprising:
when a link on an Ethernet ring network is faulty, determining, by a ring node which detects the fault, whether a faulty link is a link where a normally blocked port is located;
sending, by the ring node, a first control message which carries first indication information to other ring nodes on the Ethernet ring network if the faulty link is the link where the normally blocked port is located, wherein the first indication information indicates that a forwarding table is not desired to be cleared by the other ring nodes;
when fault recovery occurs on the link and is detected by the ring node, determining, by the ring node, whether the link recovered from the faults is the link where the normally blocked port is located;

sending, by the ring node, a third control message which carries the first indication information to the other ring nodes if the link recovered from the faults is the link where the normally blocked port is located; and sending, by the ring node, a second control message which carries second indication information to the other ring nodes on the Ethernet ring network if the link recovered from the faults is not the link where the normally blocked port is located, wherein the second indication information indicates that a forwarding table is desired to be cleared.

* * * * *